(12) United States Patent
Yang et al.

(10) Patent No.: US 11,768,352 B2
(45) Date of Patent: Sep. 26, 2023

(54) OPTICAL IMAGING LENS

(71) Applicant: Calin Technology Co., Ltd., Taichung (TW)

(72) Inventors: Yi-Ling Yang, Taichung (TW); Shu-Chuan Hsu, Taichung (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 380 days.

(21) Appl. No.: 16/951,345

(22) Filed: Nov. 18, 2020

(65) Prior Publication Data

US 2022/0066137 A1 Mar. 3, 2022

(30) Foreign Application Priority Data

Aug. 26, 2020 (TW) .................................. 109129088

(51) Int. Cl.
*G02B 9/62* (2006.01)
(52) U.S. Cl.
CPC ...................................... *G02B 9/62* (2013.01)
(58) Field of Classification Search
CPC ........ G02B 9/62; G02B 9/64; G02B 13/0045; G02B 9/60; G02B 13/006
See application file for complete search history.

(56) References Cited

U.S. PATENT DOCUMENTS

| 2018/0059362 A1* | 3/2018 | Yeh | G02B 1/041 |
| 2021/0096328 A1* | 4/2021 | Wang | G02B 13/18 |

FOREIGN PATENT DOCUMENTS

| CN | 107783252 A | * | 3/2018 | ............ G02B 1/007 |
| CN | 107789166 A | * | 3/2018 | |
| CN | 110133828 A | * | 8/2019 | ............ B60R 11/04 |
| CN | 211123463 U | | 7/2020 | |
| CN | 112882209 A | * | 6/2021 | ......... G02B 13/0045 |
| EP | 2 708 930 A1 | | 3/2014 | |
| TW | 201217891 A1 | | 5/2012 | |
| TW | 201807450 A | | 3/2018 | |

OTHER PUBLICATIONS

Taiwanese Search Report for Taiwanese Application No. 109129088, dated Apr. 29, 2021, with an English translation.

* cited by examiner

*Primary Examiner* — George G. King
*Assistant Examiner* — Anna Elizabeth Smith
(74) *Attorney, Agent, or Firm* — Birch, Stewart, Kolasch & Birch, LLP

(57) ABSTRACT

An optical imaging lens, in order from an object side to an image side along an optical axis, includes a first lens having negative refractive power; a second lens; a third lens cemented with the second lens to form a first compound lens having negative refractive power; a fourth lens having positive refractive power; a fifth lens; a sixth lens cemented with the fifth lens to form a second compound lens having positive refractive power; a seventh lens having positive refractive power. The optical imaging lens could provide a better optical performance of high image quality and low distortion.

18 Claims, 9 Drawing Sheets

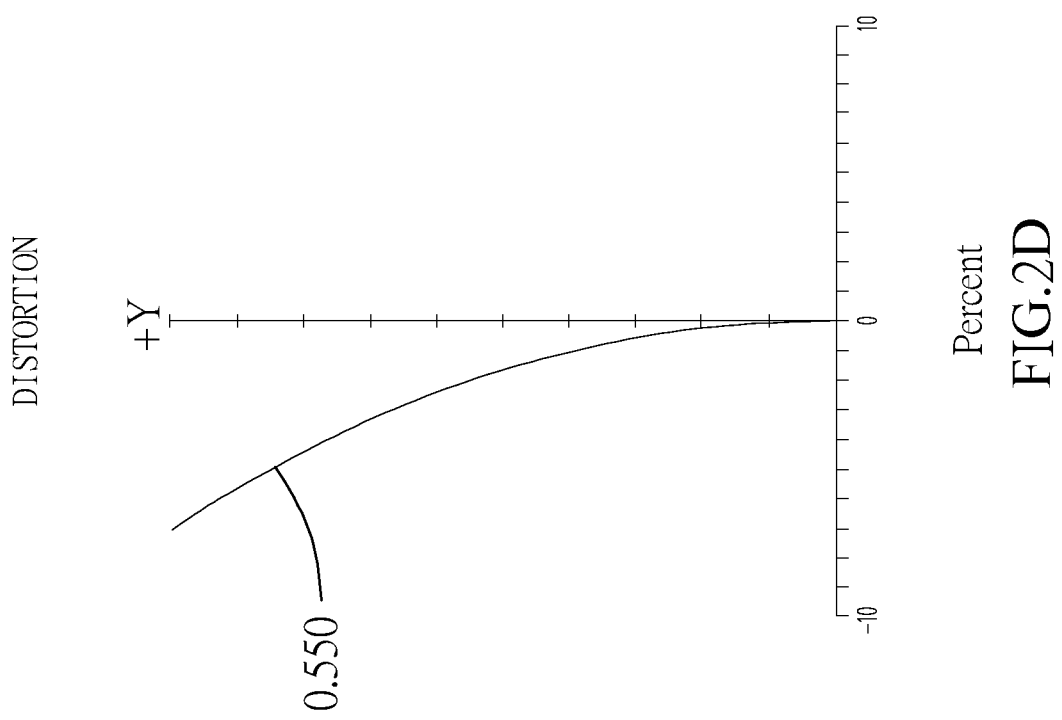

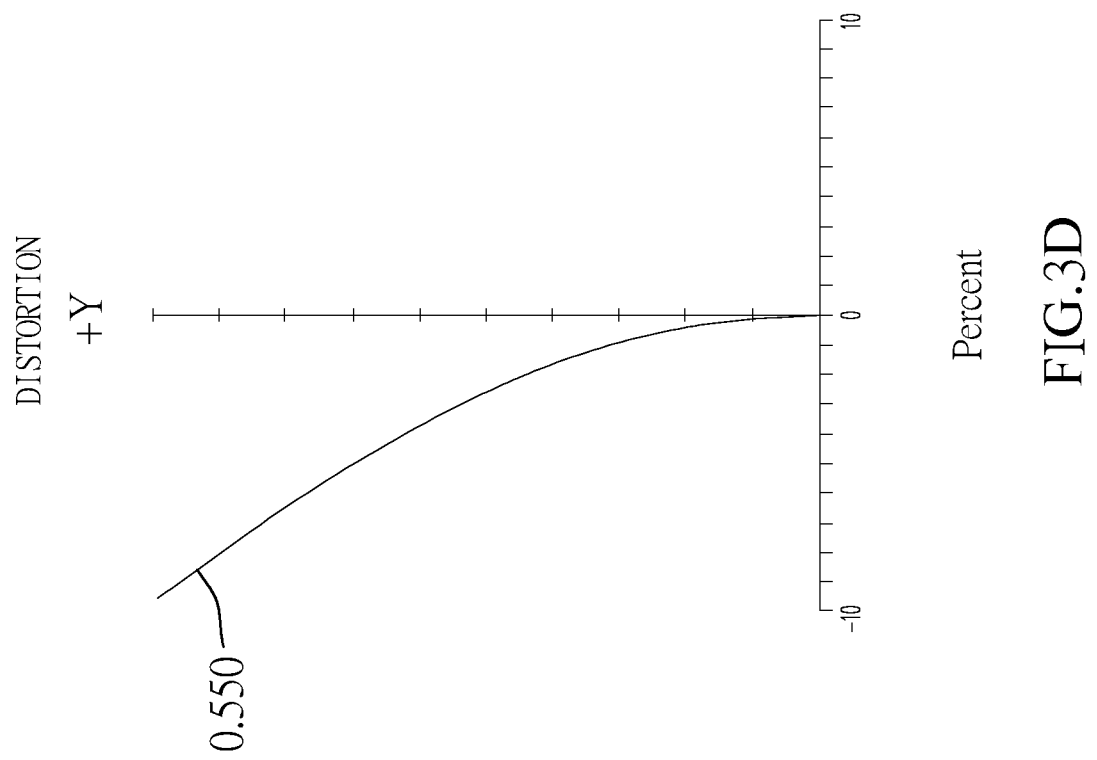

OPTICAL IMAGING LENS

BACKGROUND OF THE INVENTION

Technical Field

The present invention generally relates to an optical image capturing system, and more particularly to an optical imaging lens which provides a better optical performance of high image quality and low distortion.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role, collecting environmental information through various lenses and sensors to ensure the driving safety of the driver. Furthermore, as the image quality of the automotive lens changes with the temperature of an external application environment, the temperature requirements of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens which provides a better optical performance of high image quality and low distortion.

The present invention provides an optical imaging lens, in order from an object side to an image side along an optical axis, including a first lens, a second lens, a third lens, a fourth lens, a fifth lens, a sixth lens, and a seventh lens, wherein the first lens has negative refractive power. An object-side surface of the second lens toward the object side is a concave surface, and an image-side surface of the second lens toward the image side is a convex surface. An object-side surface of the third lens toward the object side is a concave surface, and an image-side surface of the third lens toward the image side is a convex surface. The object-side surface of the third lens and the image-side surface of the second lens are cemented to form a first compound lens having negative refractive power. The fourth lens has positive refractive power. The sixth lens is cemented with the fifth lens to form a second compound lens having positive refractive power. The seventh lens has positive refractive power.

In addition, the another primary objective of the present invention is to provide an optical imaging lens, in order from an object side to an image side along an optical axis, including a first lens, a second lens, a third lens, a fourth lens, a fifth lens, a sixth lens, and a seventh lens, wherein the optical imaging lens satisfies: $2.5 \leq (f1+f2+f3+f4+f5+f6+f7)/f \leq 13.5$; f is a focal length of the optical imaging lens; f1 is a focal length of the first lens; f2 is a focal length of the second lens; f3 is a focal length of the third lens; f4 is a focal length of the fourth lens; f5 is a focal length of the fifth lens; f6 is a focal length of the sixth lens; f7 is a focal length of the seventh lens.

With the aforementioned design, the optical imaging lens of the present invention could achieve the effect of high image quality and low distortion.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 2D is a diagram showing the distortion of the optical imaging lens according to the second embodiment of the present invention;

FIG. 3D is a diagram showing the distortion of the optical imaging lens according to the third embodiment of the present invention.

DETAILED DESCRIPTION OF THE INVENTION

Figure 1A:
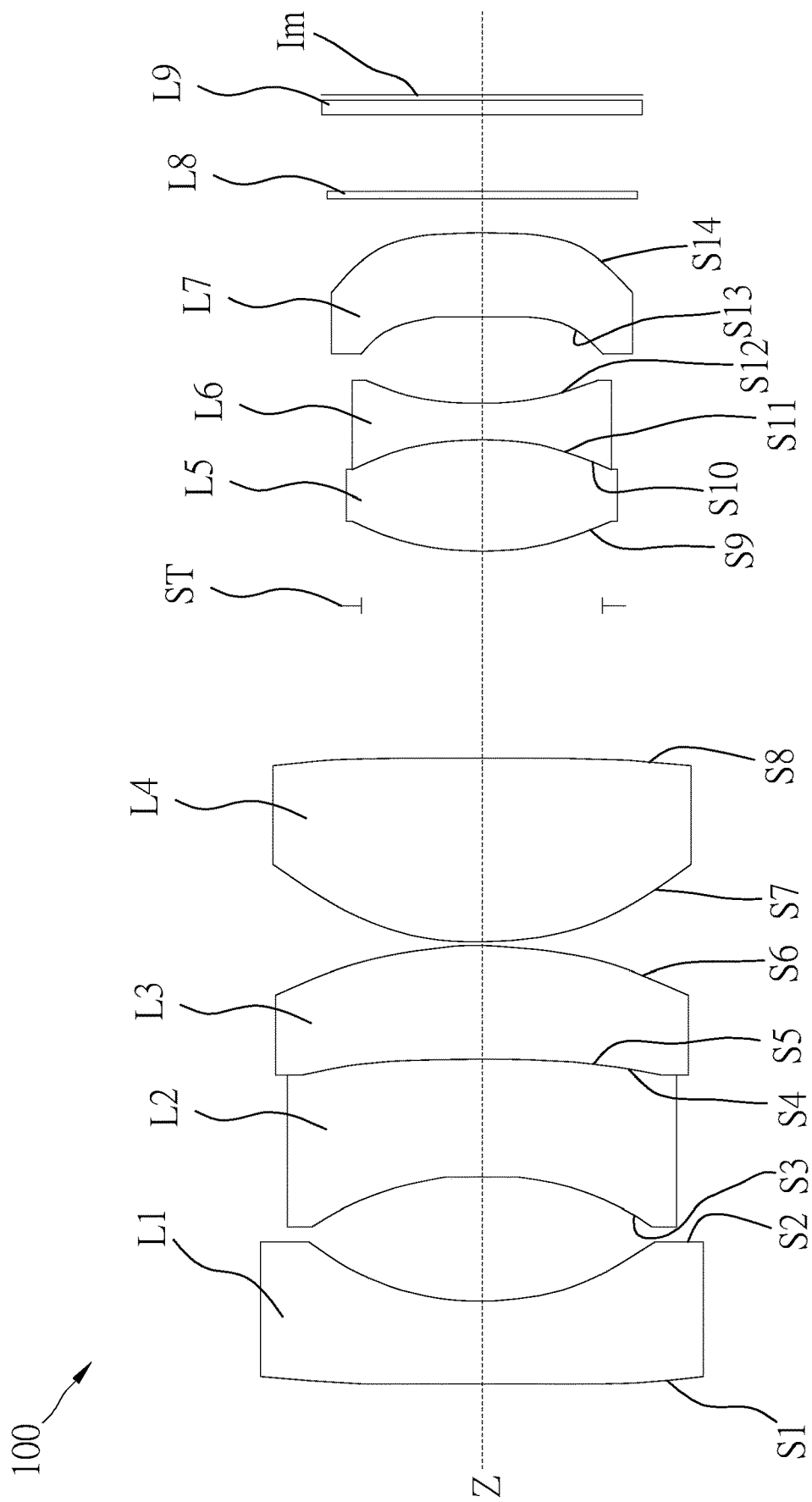
FIG. 1A is a schematic view of the optical imaging lens according to a first embodiment of the present invention.

An optical imaging lens 100 of a first embodiment of the present invention is illustrated in FIG. 1A, which includes, in order along an optical axis Z from an object side to an image side, a first lens L1, a second lens L2, a third lens L3, a fourth lens L4, a fifth lens L5, a sixth lens L6, and a seventh lens L7.

The first lens L1 has negative refractive power, wherein an object-side surface S1 of the first lens L1 is a convex surface toward the object side, and an image-side surface S2 thereof is a concave surface toward the image side.

The second lens L2 and the third lens L3 are adhered together to form a first compound lens, which could effectively improve a chromatic aberration of the optical imaging lens 100 and reduce an aberration of the optical imaging lens 100. In an embodiment, a cemented surface between the second lens L2 and the third lens L3 could be a flat surface or a convex surface toward the image side. Preferably, in the current embodiment, the first compound lens has negative refractive power. In addition, in the current embodiment, the second lens L2 has negative refractive power, wherein an object-side surface S3 of the second lens L2 is a concave surface toward the object side, and an image-side surface S4 thereof is a convex surface toward the image side; the third lens L3 has positive refractive power, wherein an object-side surface S5 of the third lens L3 is a concave surface toward the object side and is cemented with the image-side surface S4 of the second lens L2, and an image-side surface S6 of the third lens L3 is a convex surface; the cemented surface between the second lens L2 and the third lens L3 is a convex surface toward the image side. In an embodiment, the image-side surface S4 of the second lens L2 and the object-side surface S5 of the third lens L3 could be a flat surface, so that the cemented surface between the second lens L2 and the third lens L3 is a flat surface.

The fourth lens L4 has positive refractive power. In the current embodiment, the fourth lens L4 is a biconvex lens, wherein an object-side surface S7 of the fourth lens L4 is a convex surface toward the object side and an image-side surface S8 thereof is a convex surface toward the image side.

The fifth lens L5 and the sixth lens L6 are adhered together to form a second compound lens, which could effectively improve a chromatic aberration of the optical imaging lens 100 and reduce an aberration of the optical imaging lens 100. Preferably, the second compound lens has positive refractive power. The fifth lens L5 has positive refractive power, wherein an object-side surface S9 of the fifth lens L5 is a convex surface toward the object side. In the current embodiment, the fifth lens L5 is a biconvex lens, wherein the object-side surface S9 of the fifth lens L5 is a convex surface and an image-side surface S10 of the fifth lens L5 is a convex surface toward the image side. The sixth lens L6 has negative refractive power, wherein an image-side surface S12 of the sixth lens L6 is a concave surface. In the current embodiment, the sixth lens L6 is a biconcave lens, wherein an object-side surface S11 of the sixth lens L6 is a concave surface and is cemented with the image-side surface S10 of the fifth lens L5, so that a cemented surface between the fifth lens L5 and the sixth lens L6 is a convex surface toward the image side.

The seventh lens L7 has positive refractive power. In the current embodiment, the seventh lens L7 is a meniscus lens, wherein an object-side surface S13 of the seventh lens L7 is a concave surface toward the object side, and an image-side surface S14 of the seventh lens L7 is a convex surface toward the image side.

Additionally, the optical imaging lens 100 could further include an aperture ST, an infrared rays filter L8, and a protective glass L9, wherein the aperture ST is disposed between the fourth lens L4 and the fifth lens L5; the infrared rays filter L8 is disposed between the seventh lens L7 and the protective glass L9. Preferably, the infrared rays filter L8 is made of glass, and the protective glass L9 is disposed between the infrared rays filter L8 and an image plane Im of the optical imaging lens 100.

In order to keep the optical imaging lens 100 in good optical performance and high imaging quality, the optical imaging lens 100 further satisfies:

$$-60 \leq f23/f \leq -10; \tag{1}$$

$$4.5 \leq f56/f \leq 7.5; \tag{2}$$

$$2.5 \leq (f1+f2+f3+f4+f5+f6+f7)/f \leq 13.5; \tag{3}$$

$$0.05 \leq f4/f7 \leq 0.6; \tag{4}$$

$$|Vd2-Vd3| \leq 20; \tag{5}$$

$$TTL/(f*\tan(FOV/2)) \geq 8; \tag{6}$$

wherein f is a focal length of the optical imaging lens 100; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f23 is a focal length of the first compound lens; f56 is a focal length of the second compound lens; Vd2 is an Abbe number of the second lens L2; Vd3 is an Abbe number of the third lens L3; TTL is a total track length of the optical imaging lens 100; FOV is a maximal field of view of the optical imaging lens 100. Preferably, the maximal field of view (FOV) of the optical imaging lens 100 ranges between 50 degrees and 80 degrees.

Parameters of the optical imaging lens 100 of the first embodiment of the present invention are listed in the following Table 1, including the focal length (f) (also called an effective focal length (EFL)) of the optical imaging lens 100, a F-number (Fno), the maximal field of view (FOV), a radius of curvature (R) of each lens, a distance (D) between each surface and the next surface on the optical axis Z, a refractive index (Nd) of each lens, and the Abbe number (Vd) of each lens, wherein a unit of the focal length, the radius of curvature, and the thickness is millimeter (mm).

TABLE 1

| f = 10.200 mm; Fno = 1.8; FOV = 52.400 deg | | | | | |
|---|---|---|---|---|---|
| Surface | R(mm) | D(mm) | Nd | Vd | Note |
| 1 | 99.58038 | 2.62939 | 1.51633 | 64.142022 | L1 |
| 2 | 8.75687 | 3.905787 | | | |
| 3 | −10.04539 | 3.643634 | 1.6727 | 32.099206 | L2 |
| 4 | −39.71168 | 3.560855 | 1.717004 | 47.927969 | L3 |
| 5 | −14.65294 | 0.1 | | | |
| 6 | 9.319929 | 5.796149 | 1.496999 | 81.545888 | L4 |
| 7 | −47.48013 | 4.759397 | | | |
| ST | Infinity | 1.692603 | | | |
| 9 | 9.919993 | 3.396483 | 1.806099 | 40.929791 | L5 |
| 10 | −9.919993 | 1.2 | 1.805181 | 25.425363 | L6 |
| 11 | 9.919993 | 2.717985 | | | |

TABLE 1-continued f = 10.200 mm; Fno = 1.8; FOV = 52.400 deg

| Surface | R(mm) | D(mm) | Nd | Vd | Note |
|---------|-------|-------|------|------|------|
| 12 | −32.55603 | 2.655717 | 1.583126 | 59.374673 | L7 |
| 13 | −19.38033 | 1 | | | |
| 14 | Infinity | 0.3 | 1.5168 | 64.167336 | infrared rays filter |
| 15 | Infinity | 2.349195 | | | |
| 16 | Infinity | 0.5 | 1.5168 | 64.167336 | protective glass |
| 17 | Infinity | 0.125 | | | |
| Im | Infinity | | | | |

It can be seen from Table 1 that, in the first embodiment, the focal length of the optical imaging lens 100 (*f*) is 10.200 mm; the Abbe number of the second lens L2 (Vd2) is 32.099206; the Abbe number of the third lens L3 (Vd3) is 47.927969. In addition, f1=−18.728 mm; f2=−14.579 mm; f3=20.773 mm; f4=16.189 mm; f5=12.268 mm; f6=−12.214 mm; 17=76.204 mm; f23=−188.445 mm; f56=59.856 mm.

With the aforementioned design, (f1+f2+f3+f4+f5+f6+f7)/f is about 7.870; f23/f is about −18.48; f56/f is about 5.87; f4/f7 is about 0.21; |Vd2−Vd3| is about 15.9; TTL/(f*tan(FOV/2)) is about 8.036, which satisfies the aforementioned conditions (1) to (6).

Figures 1B, 1C:
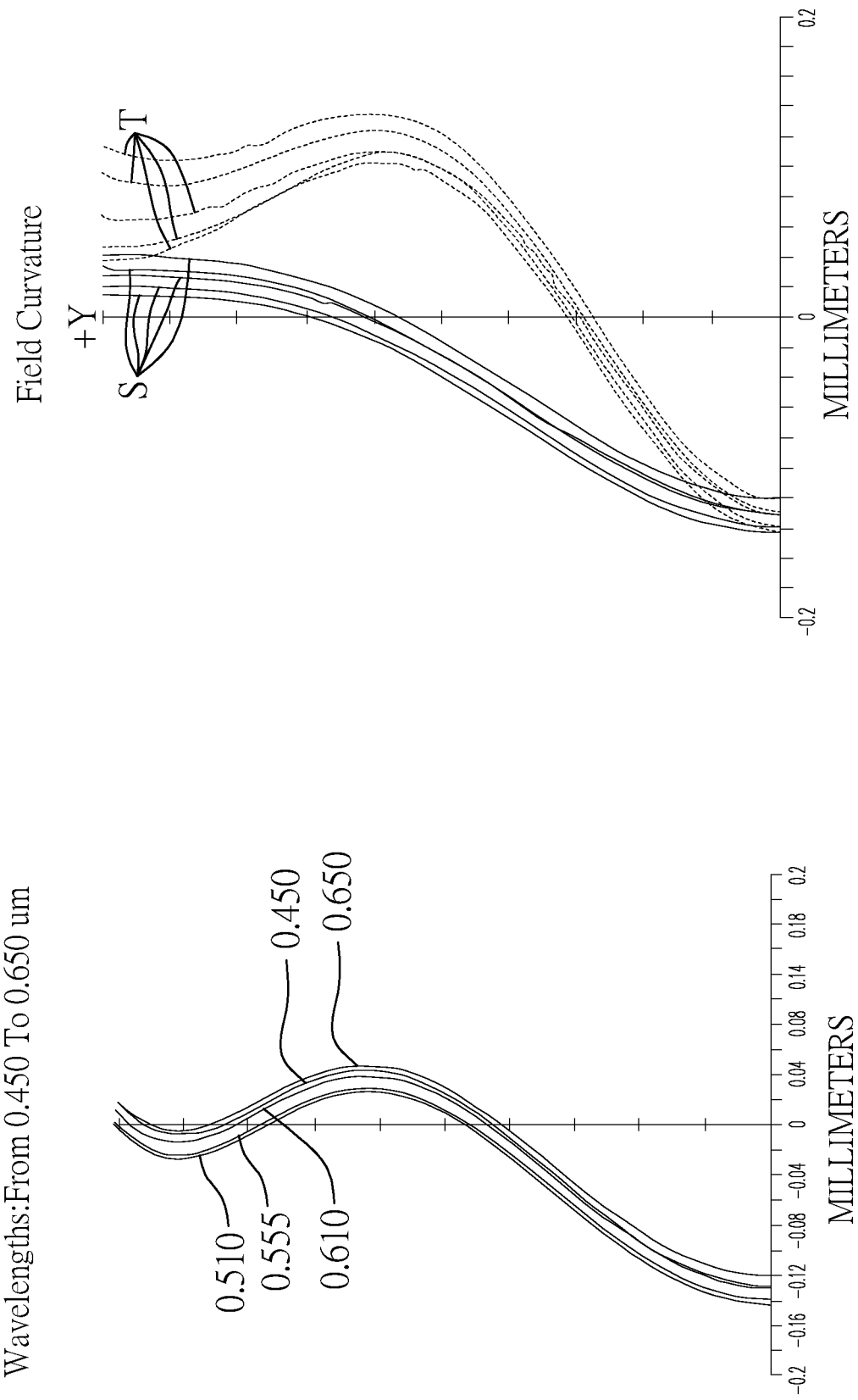
FIG. 1B is a diagram showing the longitudinal spherical aberration of the optical imaging lens according to the first embodiment of the present invention.
FIG. 1C is a diagram showing the field curvature of the optical imaging lens according to the first embodiment of the present invention.
Figure 1D:
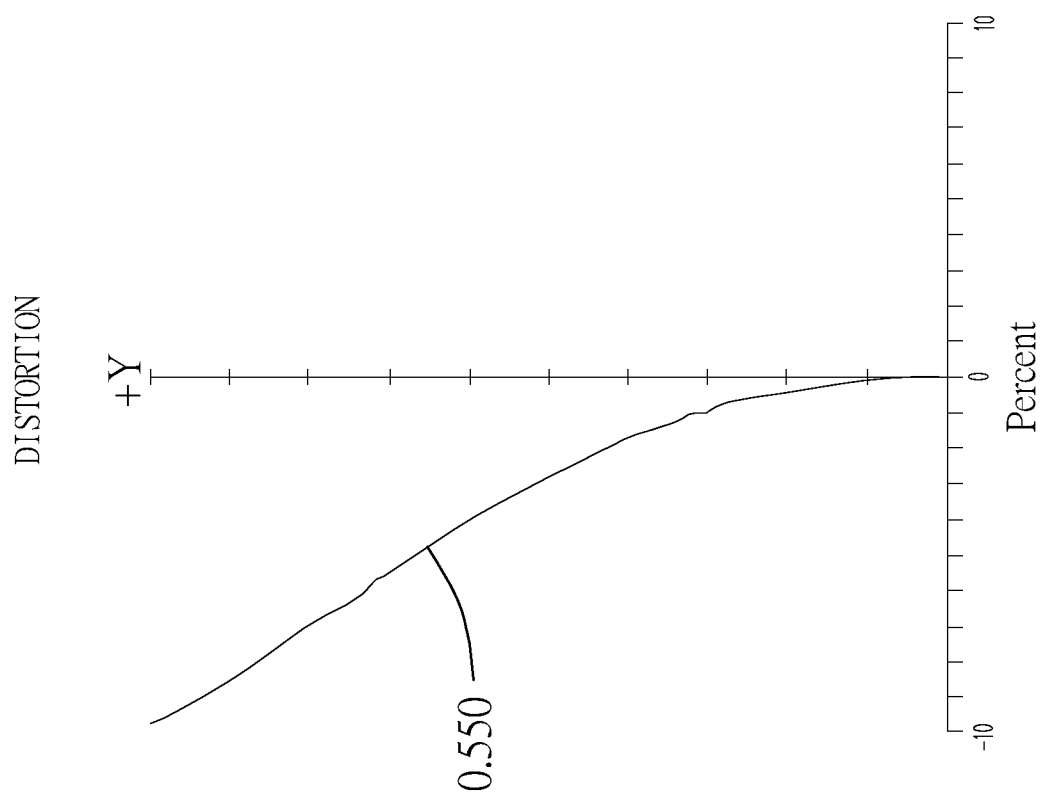
FIG. 1D is a diagram showing the distortion of the optical imaging lens according to the first embodiment of the present invention.

Referring to FIG. 1B to FIG. 1D, with the aforementioned design, the optical imaging lens 100 according to the first embodiment of the present invention could effectively enhance image quality and lower a distortion thereof.

Figure 2A:
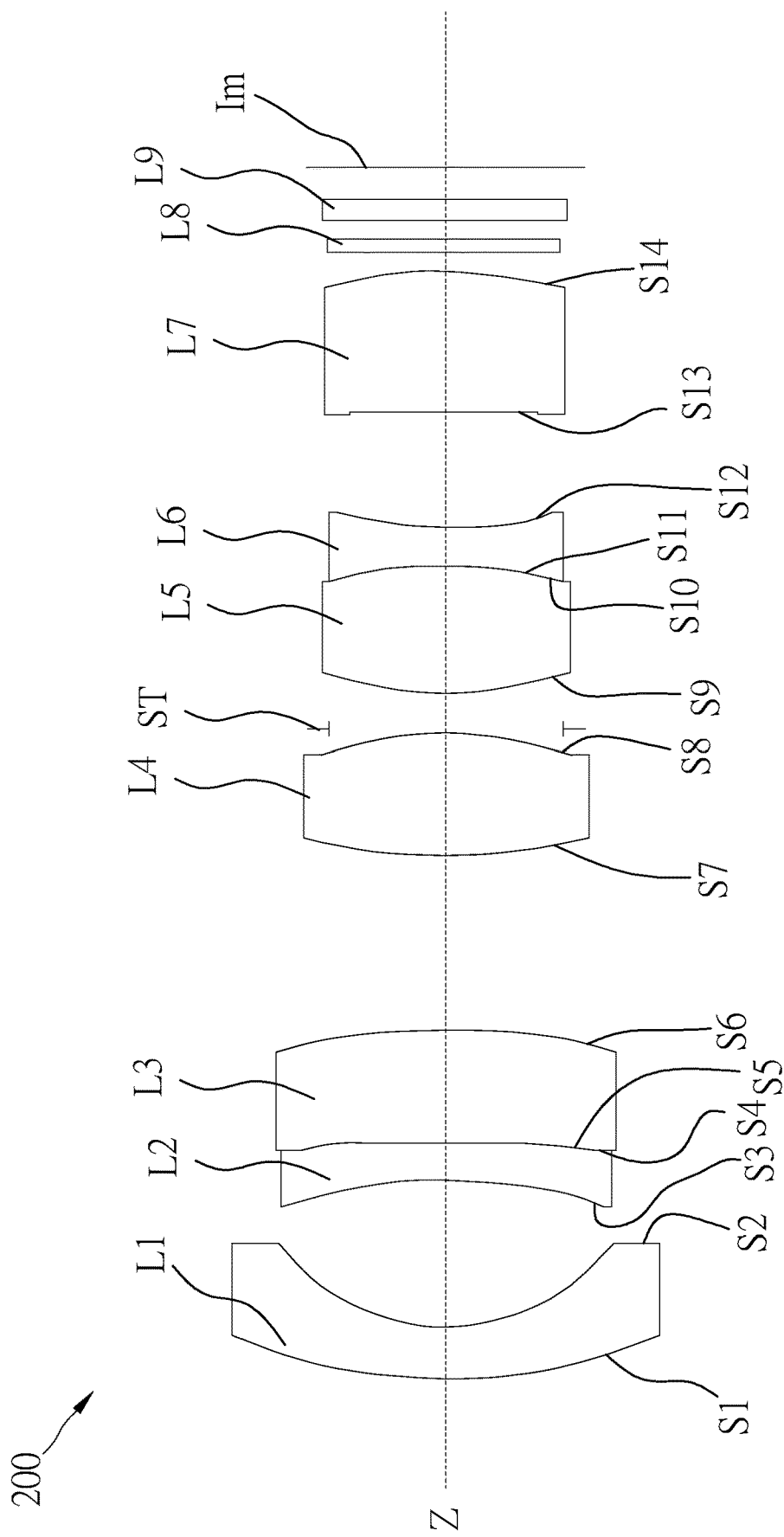
FIG. 2A is a schematic view of the optical imaging lens according to a second embodiment of the present invention.

An optical imaging lens 200 of a second embodiment of the present invention is illustrated in FIG. 2A, which includes, in order along an optical axis Z from an object side to an image side, a first lens L1, a second lens L2, a third lens L3, a fourth lens L4, a fifth lens L5, a sixth lens L6, and a seventh lens L7.

The first lens L1 has negative refractive power, wherein an object-side surface S1 of the first lens L1 is a convex surface toward the object side, and an image-side surface S2 thereof is a concave surface toward the image side.

The second lens L2 and the third lens L3 are adhered together to form a first compound lens, which could effectively improve a chromatic aberration of the optical imaging lens 200 and reduce an aberration of the optical imaging lens 200. In an embodiment, a cemented surface between the second lens L2 and the third lens L3 could be a flat surface or a convex surface toward the image side. Preferably, in the current embodiment, the first compound lens has negative refractive power. In addition, in the current embodiment, the second lens L2 has negative refractive power, wherein an object-side surface S3 of the second lens L2 is a concave surface toward the object side, and an image-side surface S4 thereof is a convex surface toward the image side; the third lens L3 has positive refractive power, wherein an object-side surface S5 of the third lens L3 is a concave surface toward the object side and is cemented with the image-side surface S4 of the second lens L2, and an image-side surface S6 of the third lens L3 is a convex surface; the cemented surface between the second lens L2 and the third lens L3 is a convex surface toward the image side. In an embodiment, the image-side surface S4 of the second lens L2 and the object-side surface S5 of the third lens L3 could be a flat surface, so that the cemented surface between the second lens L2 and the third lens L3 is a flat surface.

The fourth lens L4 has positive refractive power. In the current embodiment, the fourth lens L4 is a biconvex lens, wherein an object-side surface S7 of the fourth lens L4 is a convex surface toward the object side and an image-side surface S8 thereof is a convex surface toward the image side.

The fifth lens L5 and the sixth lens L6 are adhered together to form a second compound lens, which could effectively improve a chromatic aberration of the optical imaging lens 200 and reduce an aberration of the optical imaging lens 200. Preferably, the second compound lens has positive refractive power. The fifth lens L5 has positive refractive power, wherein an object-side surface S9 of the fifth lens L5 is a convex surface toward the object side. In the current embodiment, the fifth lens L5 is a biconvex lens, wherein the object-side surface S9 of the fifth lens L5 is a convex surface and an image-side surface S10 of the fifth lens L5 is a convex surface toward the image side. The sixth lens L6 has negative refractive power, wherein an image-side surface S12 of the sixth lens L6 is a concave surface. In the current embodiment, the sixth lens L6 is a biconcave lens, wherein an object-side surface S11 of the sixth lens L6 is a concave surface and is cemented with the image-side surface S10 of the fifth lens L5, so that a cemented surface between the fifth lens L5 and the sixth lens L6 is a convex surface toward the image side.

The seventh lens L7 has positive refractive power. In the current embodiment, the seventh lens L7 is a meniscus lens, wherein an object-side surface S13 of the seventh lens L7 is a concave surface toward the object side, and an image-side surface S14 of the seventh lens L7 is a convex surface toward the image side.

Additionally, the optical imaging lens 200 could further include an aperture ST, an infrared rays filter L8, and a protective glass L9, wherein the aperture ST is disposed between the fourth lens L4 and the fifth lens L5; the infrared rays filter L8 is disposed between the seventh lens L7 and the protective glass L9. Preferably, the infrared rays filter L8 is made of glass, and the protective glass L9 is disposed between the infrared rays filter L8 and an image plane Im of the optical imaging lens 200.

In order to keep the optical imaging lens 200 in good optical performance and high imaging quality, the optical imaging lens 200 further satisfies:

$$-60 \leq f23/f \leq -10; \quad (1)$$

$$4.5 \leq f56/f \leq 7.5; \quad (2)$$

$$2.5 \leq (f1+f2+f3+f4+f5+f6+f7)/f \leq 13.5; \quad (3)$$

$$0.05 \leq f4/f7 \leq 0.6; \quad (4)$$

$$|Vd2-Vd3| \leq 20; \quad (5)$$

wherein f is a focal length of the optical imaging lens 200; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f23 is a focal length of the first compound lens; f56 is a focal length of the second compound lens; Vd2 is an Abbe number of the second lens L2; Vd3 is an Abbe number of the third lens L3; TTL is a total track length of the optical imaging lens 200; FOV is a maximal field of view of the optical imaging lens 200. Preferably, the maximal field of view (FOV) of the optical imaging lens 200 ranges between 50 degrees and 80 degrees.

Parameters of the optical imaging lens 200 of the second embodiment of the present invention are listed in the following Table 2, including the focal length (f) (also called an effective focal length (EFL)) of the optical imaging lens 200, a F-number (Fno), the maximal field of view (FOV), a radius of curvature (R) of each lens, a distance (D) between each surface and the next surface on the optical axis Z, a refractive index (Nd) of each lens, and the Abbe number (Vd) of each lens, wherein a unit of the focal length, the radius of curvature, and the thickness is millimeter (mm).

TABLE 2 f = 6.743 mm; Fno = 1.8; FOV = 77.100 deg

| Surface | R(mm) | D(mm) | Nd | Vd | Note |
|---|---|---|---|---|---|
| 1 | 14.49983 | 1.4 | 1.518229 | 58.902057 | L1 |
| 2 | 5.632457 | 3.895017 | | | |
| 3 | −12.56073 | 1 | 1.548141 | 45.784277 | L2 |
| 4 | −40 | 3.001306 | 1.834 | 37.160487 | L3 |
| 5 | −19.22922 | 4.682017 | | | |
| 6 | 15.18238 | 3.265418 | 1.496999 | 81.545888 | L4 |
| 7 | −9.667596 | 0.1 | | | |
| ST | Infinity | 1 | | | |
| 9 | 11.44924 | 3.397701 | 1.804 | 46.527532 | L5 |
| 10 | −11.44924 | 1 | 1.717362 | 29.518091 | L6 |
| 11 | 11 | 3.059344 | | | |
| 12 | −200 | 3.761461 | 1.58313 | 59.460905 | L7 |
| 13 | −15 | 1 | | | |
| 14 | Infinity | 0.4 | 1.5168 | 64.167336 | infrared rays filter |
| 15 | Infinity | 0.775 | | | |
| 16 | Infinity | 0.5 | 1.5168 | 64.167336 | protective glass |
| 17 | Infinity | 0.125 | | | |
| Im | Infinity | | | | |

It can be seen from Table 2 that, in the second embodiment, the focal length of the optical imaging lens 200 (f) is 6.743 mm; the Abbe number of the second lens L2 (Vd2) is 45.784277; the Abbe number of the third lens L3 (Vd3) is 37.160487. In addition, f1=−18.729 mm; f2=−19.528 mm; f3=27.100 mm; f4=12.440 mm; f5=12.993 mm; f6=−17.281 mm; f7=27.624 mm; f23=−363.474 mm; f56=43.505 mm.

With the aforementioned design, (f1+f2+f3+f4+f5+f6+f7)/f is about 3.585; f23/f is about −53.91; f56/f is about 6.45; f4/f7 is about 0.45; |Vd2−Vd3| is about 8.6; TTL/(f*tan(FOV/2)) is about 6.023, which satisfies the aforementioned conditions (1) to (5).

Figure 2C:
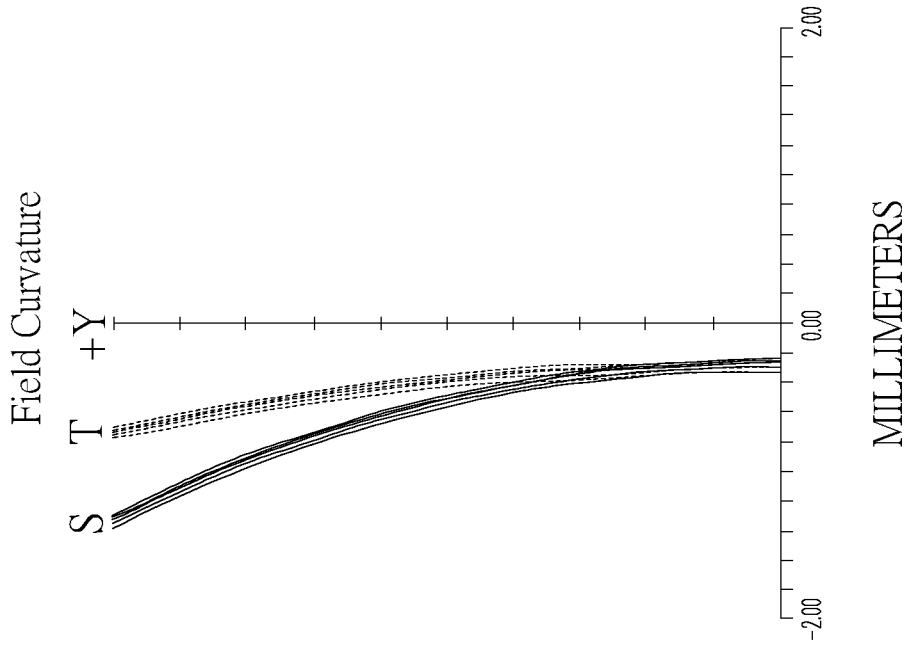
FIG. 2C is a diagram showing the field curvature of the optical imaging lens according to the second embodiment of the present invention.
Figure 2B:
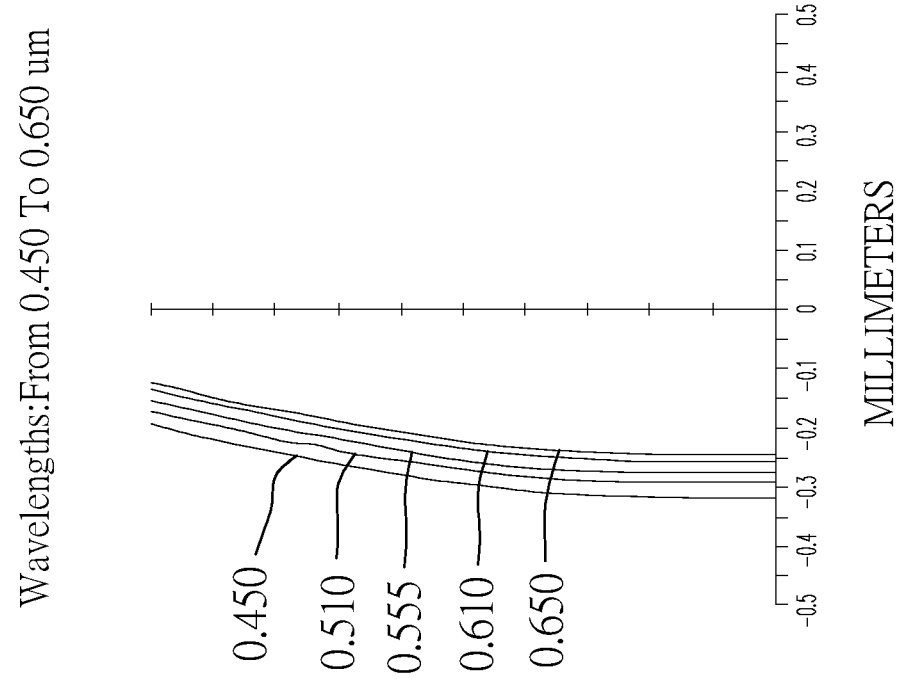
FIG. 2B is a diagram showing the longitudinal spherical aberration of the optical imaging lens according to the second embodiment of the present invention.

Referring to FIG. 2B to FIG. 2D, with the aforementioned design, the optical imaging lens 200 according to the second embodiment of the present invention could effectively enhance image quality and lower a distortion thereof.

Figure 3A:
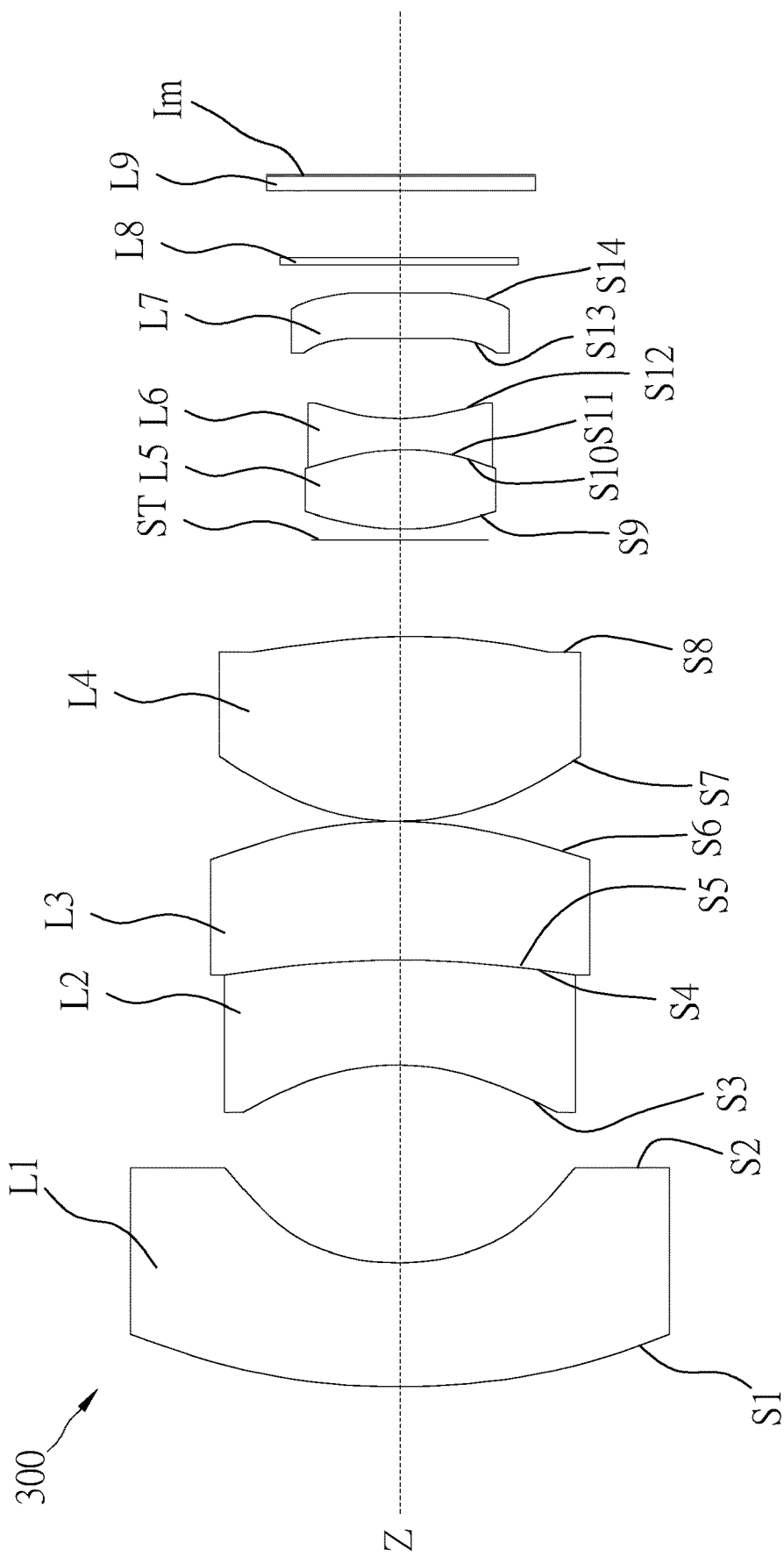
FIG. 3A is a schematic view of the optical imaging lens according to a third embodiment of the present invention.

An optical imaging lens 300 of a third embodiment of the present invention is illustrated in FIG. 3A, which includes, in order along an optical axis Z from an object side to an image side, a first lens L1, a second lens L2, a third lens L3, a fourth lens L4, a fifth lens L5, a sixth lens L6, and a seventh lens L7.

The first lens L1 has negative refractive power, wherein an object-side surface S1 of the first lens L1 is a convex surface toward the object side, and an image-side surface S2 thereof is a concave surface toward the image side.

The second lens L2 and the third lens L3 are adhered together to form a first compound lens, which could effectively improve a chromatic aberration of the optical imaging lens 300 and reduce an aberration of the optical imaging lens 300. In an embodiment, a cemented surface between the second lens L2 and the third lens L3 could be a flat surface or a convex surface toward the image side. Preferably, in the current embodiment, the first compound lens has negative refractive power. In addition, in the current embodiment, the second lens L2 has negative refractive power, wherein an object-side surface S3 of the second lens L2 is a concave surface toward the object side, and an image-side surface S4 thereof is a convex surface toward the image side; the third lens L3 has positive refractive power, wherein an object-side surface S5 of the third lens L3 is a concave surface toward the object side and is cemented with the image-side surface S4 of the second lens L2, and an image-side surface S6 of the third lens L3 is a convex surface; the cemented surface between the second lens L2 and the third lens L3 is a convex surface toward the image side. In an embodiment, the image-side surface S4 of the second lens L2 and the object-side surface S5 of the third lens L3 could be a flat surface, so that the cemented surface between the second lens L2 and the third lens L3 is a flat surface.

The fourth lens L4 has positive refractive power. In the current embodiment, the fourth lens L4 is a biconvex lens, wherein an object-side surface S7 of the fourth lens L4 is a convex surface toward the object side and an image-side surface S8 thereof is a convex surface toward the image side.

The fifth lens L5 and the sixth lens L6 are adhered together to form a second compound lens, which could effectively improve a chromatic aberration of the optical imaging lens 300 and reduce an aberration of the optical imaging lens 300. Preferably, the second compound lens has positive refractive power. The fifth lens L5 has positive refractive power, wherein an object-side surface S9 of the fifth lens L5 is a convex surface toward the object side. In the current embodiment, the fifth lens L5 is a biconvex lens, wherein the object-side surface S9 of the fifth lens L5 is a convex surface and an image-side surface S10 of the fifth lens L5 is a convex surface toward the image side. The sixth lens L6 has negative refractive power, wherein an image-side surface S12 of the sixth lens L6 is a concave surface. In the current embodiment, the sixth lens L6 is a biconcave lens, wherein an object-side surface S11 of the sixth lens L6 is a concave surface and is cemented with the image-side surface S10 of the fifth lens L5, so that a cemented surface between the fifth lens L5 and the sixth lens L6 is a convex surface toward the image side.

The seventh lens L7 has positive refractive power. In the current embodiment, the seventh lens L7 is a meniscus lens, wherein an object-side surface S13 of the seventh lens L7 is a concave surface toward the object side, and an image-side surface S14 of the seventh lens L7 is a convex surface toward the image side.

Additionally, the optical imaging lens 300 could further include an aperture ST, an infrared rays filter L8, and a protective glass L9, wherein the aperture ST is disposed between the fourth lens L4 and the fifth lens L5; the infrared rays filter L8 is disposed between the seventh lens L7 and the protective glass L9. Preferably, the infrared rays filter L8 is made of glass, and the protective glass L9 is disposed between the infrared rays filter L8 and an image plane Im of the optical imaging lens 300.

In order to keep the optical imaging lens 300 in good optical performance and high imaging quality, the optical imaging lens 300 further satisfies:

$$-60 \leq f23/f \leq -10; \quad (1)$$

$$4.5 \leq f56/f \leq 7.5; \quad (2)$$

$$2.5 \leq (f1+f2+f3+f4+f5+f6+f7)/f \leq 13.5; \quad (3)$$

$$0.05 \leq f4/f7 \leq 0.6; \quad (4)$$

$$|Vd2-Vd3| \leq 20; \quad (5)$$

$$TTL/(f*\tan(FOV/2)) \geq 8; \quad (6)$$

wherein f is a focal length of the optical imaging lens 300; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f23 is a focal length of the first compound lens; f56 is a focal length of the second compound lens; Vd2 is an Abbe number of the second lens L2; Vd3 is an Abbe number of the third lens L3; TTL is a total track length of the optical imaging lens 300; FOV is a maximal field of view of the optical imaging lens 300. Preferably, the maximal field of view (FOV) of the optical imaging lens 300 ranges between 50 degrees and 80 degrees.

Parameters of the optical imaging lens 300 of the third embodiment of the present invention are listed in the following Table 3, including the focal length (f) (also called an effective focal length (EFL)) of the optical imaging lens 300, a F-number (Fno), the maximal field of view (FOV), a radius of curvature (R) of each lens, a distance (D) between each surface and the next surface on the optical axis Z, a refractive index (Nd) of each lens, and the Abbe number (Vd) of each lens, wherein a unit of the focal length, the radius of curvature, and the thickness is millimeter (mm).

TABLE 3

| f = 8.000 mm; Fno = 1.8; FOV = 64.500 deg | | | | | |
|---|---|---|---|---|---|
| Surface | R(mm) | D(mm) | Nd | Vd | Note |
| 1 | 27.24988 | 4.563321 | 1.51633 | 64.142022 | L1 |
| 2 | 7.624461 | 7.314212 | | | |
| 3 | −11.15372 | 3.95522 | 1.654115 | 39.682794 | L2 |
| 4 | −36.61397 | 5.111973 | 1.691002 | 54.822578 | L3 |
| 5 | −18.31413 | 0.1 | | | |
| 6 | 10.58285 | 6.722308 | 1.496999 | 81.545888 | L4 |
| 7 | −28.17487 | 3.672543 | | | |
| ST | Infinity | 0.3938839 | | | |
| 9 | 9.699683 | 2.90229 | 1.804 | 46.527532 | L5 |
| 10 | −9.699683 | 1.2 | 1.755199 | 27.512089 | L6 |
| 11 | 9.699683 | 2.974889 | | | |
| 12 | −150 | 1.72399 | 1.583126 | 59.374673 | L7 |
| 13 | −42.33454 | 1 | | | |
| 14 | Infinity | 0.3 | 1.5168 | 64.167336 | infrared rays filter |
| 15 | Infinity | 2.44037 | | | |
| 16 | Infinity | 0.5 | 1.5168 | 64.167336 | protective glass |
| 17 | Infinity | 0.125 | | | |
| Im | Infinity | | | | |

It can be seen from Table 3 that, in the third embodiment, the focal length of the optical imaging lens 300 (f) is 8.000 mm; the Abbe number of the second lens L2 (Vd2) is 39.682794; the Abbe number of the third lens L3 (Vd3) is 54.822578. In addition, f1=−22.207 mm; f2=−16.655 mm; f3=27.041 mm; f4=16.390 mm; f5=11.440 mm; f6=−13.650 mm; f7=100.243 mm; f23=−100.000 mm; f56=41.341 mm.

With the aforementioned design, (f1+f2+f3+f4+f5+f6+f7)/f is about 12.862; f23/f is about 12.50; f56/f is about 5.17; f4/f7 is about 0.16; |Vd2-Vd3| is about 15.2; TTL/(f*tan(FOV/2)) is about 8.915, which satisfies the aforementioned conditions (1) to (6).

Figure 3C:
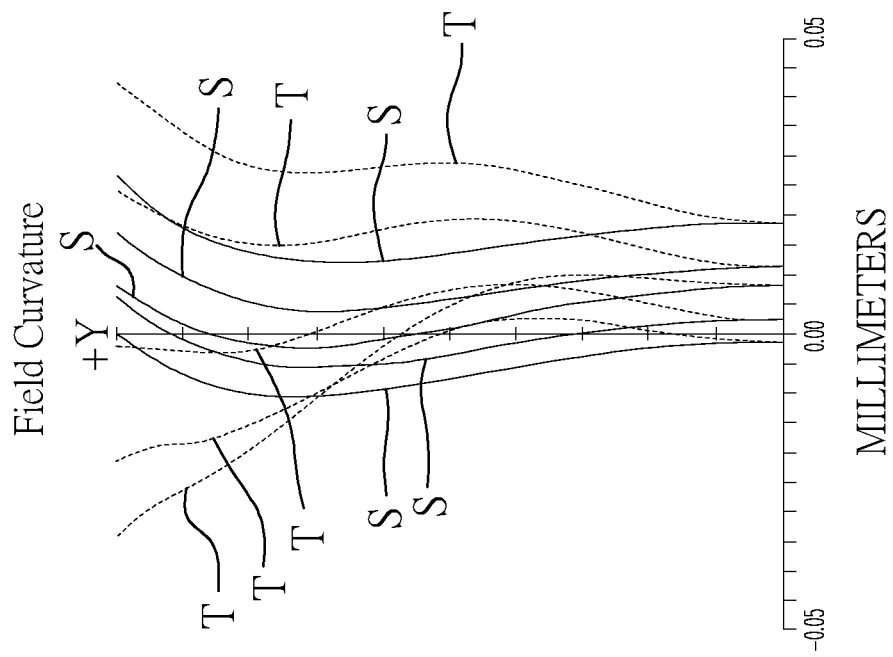
FIG. 3C is a diagram showing the field curvature of the optical imaging lens according to the third embodiment of the present invention.
Figure 3B:
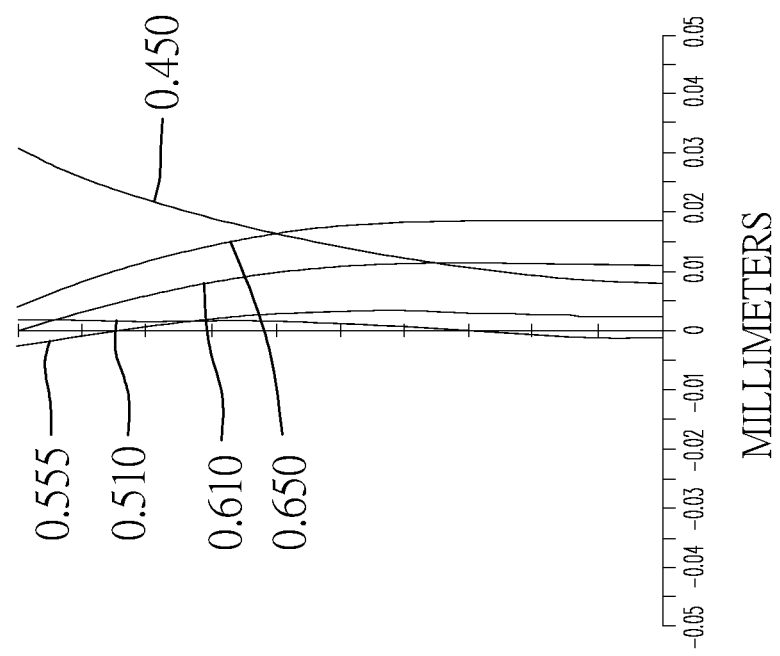
FIG. 3B is a diagram showing the longitudinal spherical aberration of the optical imaging lens according to the third embodiment of the present invention.

Referring to FIG. 3B to FIG. 3D, with the aforementioned design, the optical imaging lens 300 according to the third embodiment of the present invention could effectively enhance image quality and lower a distortion thereof.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, comprising:
    a first lens having negative refractive power;
    a second lens, wherein an object-side surface of the second lens toward the object side is a concave surface, and an image-side surface of the second lens toward the image side is a convex surface;
    a third lens, wherein an object-side surface of the third lens toward the object side is a concave surface, and an image-side surface of the third lens toward the image side is a convex surface; the object-side surface of the third lens and the image-side surface of the second lens are cemented to form a first compound lens having negative refractive power;
    a fourth lens having positive refractive power;
    a fifth lens;
    a sixth lens cemented with the fifth lens to form a second compound lens having positive refractive power; and
    a seventh lens having positive refractive power;
    wherein an object-side surface of the seventh lens is a concave surface.

2. The optical imaging lens as claimed in claim 1, wherein the second lens has negative refractive power; the third lens has positive refractive power.

3. The optical imaging lens as claimed in claim 2, wherein the fifth lens has positive refractive power; the sixth lens has negative refractive power.

4. The optical imaging lens as claimed in claim 1, wherein the optical imaging lens satisfies: $-60 \leq f23/f \leq -10$; wherein f is a focal length of the optical imaging lens; f23 is a focal length of the first compound lens.

5. The optical imaging lens as claimed in claim 1, wherein the optical imaging lens satisfies: $4.5 \leq f56/f \leq 7.5$; wherein f is a focal length of the optical imaging lens; f56 is a focal length of the second compound lens.

6. The optical imaging lens as claimed in claim 1, wherein the optical imaging lens satisfies: $2.5 \leq (f1+f2+f3+f4+f5+f6+f7)/f \leq 13.5$; wherein f is a focal length of the optical imaging lens; f1 is a focal length of the first lens; f2 is a focal length of the second lens; f3 is a focal length of the third lens; f4 is a focal length of the fourth lens; f5 is a focal length of the fifth lens; f6 is a focal length of the sixth lens; f7 is a focal length of the seventh lens.

7. The optical imaging lens as claimed in claim 1, wherein the optical imaging lens satisfies: $0.05 \leq f4/f7 \leq 0.6$; wherein f4 is a focal length of the fourth lens; f7 is a focal length of the seventh lens.

8. The optical imaging lens as claimed in claim 1, wherein the optical imaging lens satisfies: $|Vd2-Vd3| \leq 20$; wherein Vd2 is an Abbe number of the second lens; Vd3 is an Abbe number of the third lens.

9. The optical imaging lens as claimed in claim 1, wherein the optical imaging lens satisfies: $TTL/(f*\tan(FOV/2)) \geq 8$; wherein TTL is a total track length of the optical imaging lens; f is a focal length of the optical imaging lens; FOV is a maximal field of view of the optical imaging lens.

10. An optical imaging lens, in order from an object side to an image side along an optical axis, comprising:
    a first lens;
    a second lens;
    a third lens;
    a fourth lens;
    a fifth lens;
    a sixth lens; and
    a seventh lens;
    wherein the optical imaging lens satisfies: $2.5 \leq (f1+f2+f3+f4+f5+f6+f7)/f \leq 13.5$, wherein f is a focal length of the optical imaging lens; f1 is a focal length of the first lens; f2 is a focal length of the second lens; f3 is a focal length of the third lens; f4 is a focal length of the fourth lens; f5 is a focal length of the fifth lens; f6 is a focal length of the sixth lens; f7 is a focal length of the seventh lens;
    wherein the sixth lens and the fifth lens are cemented to form a second compound lens; the optical imaging lens satisfies: $4.5 \leq f56/f \leq 7.5$, wherein f56 is a focal length of the second compound lens.

11. The optical imaging lens as claimed in claim 10, wherein the second lens and the third lens are cemented to form a first compound lens; the optical imaging lens satisfies: $-60 \leq f23/f \leq -10$, wherein f23 is a focal length of the first compound lens.

12. The optical imaging lens as claimed in claim 11, wherein the first compound lens has negative refractive power.

13. The optical imaging lens as claimed in claim 10, wherein the second compound lens has positive refractive power.

14. The optical imaging lens as claimed in claim 10, wherein optical imaging lens satisfies at least one of following conditions:
    a. the second lens has negative refractive power; the third lens has positive refractive power;
    b. the fifth lens has positive refractive power; the sixth lens has negative refractive power;
    c. the first lens has negative refractive power;
    d. the fourth lens has positive refractive power;
    e. the seventh lens has positive refractive power.

15. The optical imaging lens as claimed in claim 10, wherein the optical imaging lens satisfies: $0.05 \leq f4/f7 \leq 0.6$; wherein f4 is a focal length of the fourth lens; f7 is a focal length of the seventh lens.

16. The optical imaging lens as claimed in claim 10, wherein the optical imaging lens satisfies at least one of following conditions:
    a. an image-side surface of the second lens toward the image side is a convex surface;
    b. an object-side surface of the third lens toward the object side is a concave surface;
    c. an object-side surface of the seventh lens toward the object side is a concave surface.

17. The optical imaging lens as claimed in claim 10, wherein the optical imaging lens satisfies: $|Vd2-Vd3| \leq 20$; wherein Vd2 is an Abbe number of the second lens; Vd3 is an Abbe number of the third lens.

18. The optical imaging lens as claimed in claim 10, wherein a maximal field of view (FOV) of the optical imaging lens ranges between 50 degrees and 80 degrees.

* * * * *